Dec. 19, 1967  R. T. PROULX  3,358,792
CASTER BRAKE
Filed Feb. 28, 1966

INVENTOR
Romeo T. Proulx
BY
ATTORNEYS 3,358,792
CASTER BRAKE
Romeo T. Proulx, Copiague, N.Y., assignor to VISIrecord, Inc., Copiague, N.Y., a corporation of New York
Filed Feb. 28, 1966, Ser. No. 540,435
1 Claim. (Cl. 188—29)

This invention relates to casters and more particularly to a low-profile type of caster having a brake mechanism for restraining rotation of the caster wheel.

Casters are widely used to provide mobility to furniture and equipment by employing a rolling member in the form of a wheel between the equipment base and the floor. The caster generally comprises a wheel mounted on an axle within a frame or horn which is attached to the legs or base of the equipment. An ordinary caster horn comprises two, spaced side parts connected by a top part, thus forming in cross-section an inverted U. The axle traverses these side parts, and a narrow clearance space remains between each side part and the wheel.

In many instances it is desirable or necessary to have a brake mechanism associated with each caster to control further movement of equipment after it has been pushed on its rolling casters to a chosen location. The brakes of conventional casters include brake shoes or other brake elements which cause a frictional force at the periphery of the wheel, at the wheel hub, or at the side of the wheel; a lever is required to operate the braking element. On all known casters, the major portion of the brake mechanism is mounted outside of the caster horn. Such an external mechanism was a natural development since (1) there is virtually no space inside the caster horn, (2) there are very few limitations outside the horn, and (3) the lever must be readily accessible.

In most instances space near the base area of equipment has not been a critical concern, so that external brakes of any shape were permissible. However, new equipment, designated low-profile type, is designed to have its base part at a minimum distance from the floor. For such equipment special low-profile casters have been developed in which total height has been compressed to a minimum, with the top of the horn being only a fraction of an inch above the wheel, and the mounting plate being immediately above the horn. In casters of this design the side plates of the horn are very short and, consequently, quite stiff. These dimensional and mechanical characteristics made it appear to those skilled in the art that low profile casters could not be provided with brakes which were at once functional and esthetically consistent with the design requirements.

I have invented an internal braking mechanism for low-profile casters which provides great braking power and is compact, simple and inexpensive.

Because much of the brake mechanism according to my invention is inside the horn of the caster, the appearance of the caster is virtually unaffected by the addition of the mechanism. Of course, an actuator for the mechanism must extend outside the horn to be accessible, but its functional characteristics are such that the actuator may be made to appear as an extension of the design of the caster itself.

Broadly stated this invention is a brake mechanism for a caster having a wheel rotatably mounted on an axle that extends between a pair of rigid, relatively immovable skirt plates. The brake mechanism comprises a brake member pivotally mounted between the skirt plates and having an actuator part extending beyond the peripheries of the wheel and the skirt plates. A part of the brake member is interposed between a skirt plate and the adjacent portion of the wheel and is provided with a cam projection positioned remote from the pivotal axis of the brake member. The brake member is proportioned and the position of the cam projection on the member is selected such that in one angular position of the brake member about its pivotal axis the cam projection engages the adjacent skirt plate and drives the brake member against the wheel to provide frictional braking action on the wheel and in another angular position of the brake member about its pivotal axis the cam projection is sufficiently out of engagement with the skirt plate that the brake member merely floats in the space between the skirt and the wheel such that the wheel is free to rotate. The brake member may be moved between the two angular positions by an appropriate force on the actuator part.

A caster according to my invention may also be provided with a brake member of the kind described above on each side of the wheel so that braking forces act against both sides of the wheel. Further in accordance with my invention such oppositely acting brake members may be separately actuated or they may be interlocked so that actuation of one of them simultaneously activates the other.

A brake mechanism according to my invention develops very adequate friction forces for restraining rotation of the caster wheel. The brake mechanism may be constructed and located such that it requires no additional space within the horn than already exists in most conventional casters. The mechanism merely utilizes existing necessary clearance space between the wheel and horn and simultaneously provides an attractive and very effective new brake means. Most conventional casters could be adapted to use this invention with little or no modification.

To further describe this invention a preferred embodiment is described below with references to the drawings wherein.

Figure 1:
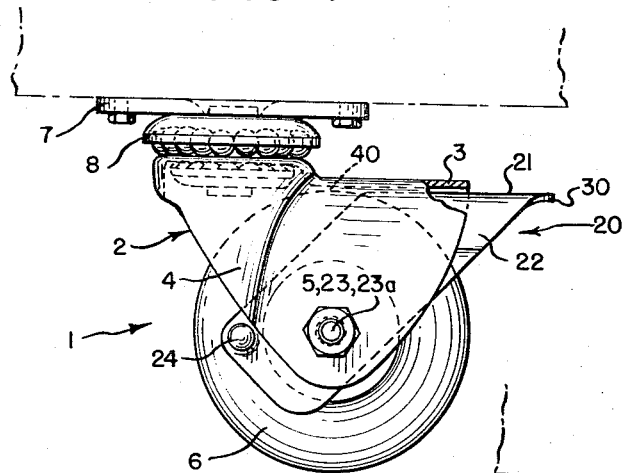
FIG. 1 is a side elevation view of the caster with the brake in neutral, unactuated position.

As shown in FIGS. 1–5, the low-profile caster and internal brake 1 is comprised of a horn or frame 2 having two spaced side skirts 4 and between them a wheel 6 rotatably mounted on axle 5. Atop the frame is mounting bracket 7 attached by a rotatable bearing joint 8.

The horn 2 is a rigid frame having a top part 3 and two spaced downward extending side skirts 4 which form an inverted U-shaped body. Through the lower parts of the skirts are aligned holes 23 through which is disposed axle 5. The axle traversing the skirts may be as simple as a stud having on one end a head and on the other end threads for engagement with a nut. Besides providing a rotatable mount for the wheel, the axle serves the purpose of determining the maximum space beetween the skirts so they will not separate or deflect during application of the brake.

The wheel 6 rotates freely between the skirts except when the brake is applied. In this compactly designed device the components are placed close together to minimize total space requirement; the dimension from the axle to the top of the horn is only slightly greater than the radius of the wheel, thus small clearance 40 exists within the horn.

In this preferred embodiment, the brake means 20 is a generally U-shaped element comprising a top part 21 and two spaced downward extending side plate 22 which act as brake members. The brake is disposed within the horn, the corresponding U-shaped bodies of both components being generally adjacent. Through each of the brake members 22 are holes 23a which are aligned with holes 23 of the horn skirts such that the brake is mounted pivotally on axle 5; this pivoting axis might easily be displaced from axle 5 to another location on the horn.

On each friction plate or brake member 22 is a cam projection 24 extending outward toward the adjacent and corresponding horn skirt 4. Each projection is located on a lower portion of the plate and is a hard, generally hemispherical raised portion which may be formed by any one of numerous methods such as dimpling, piercing, or a projection of the same or another material may be adhered to the skirt by any suitable means.

When the brake member is caused to pivot about its axis, the cam projection is forced into the space 41 between the corresponding side parts of the brake member and horn. As the cam contacts the horn skirt and rides onto the inner surface of the skirt the brake member is deflected inward away from the horn and toward the wheel, making frictional contact therewith. The horn skirt has an inwardly curving portion 42 in the area of contact with the cam such that continued pivoting of the brake member and cam urges the brake member further inward, developing a greater force against the wheel. This force applied inwardly against the wheel generates a reaction force tending to deflect and separate the horn skirts. However, as described above, the fixed-length axle prevents the space between skirts from increasing when the brake is actuated.

Extending from the top part of the brake member is a brake actuator or lever part 30. The brake member may be formed from a piece of sheet metal with its ends bent downward from the center portion forming a U-shape; the lever part 30 is merely the end part of the center portion or top part 21. A variation of the brake means within the scope of the invention comprises a single plate member acting against only one side of the wheel.

Figure 2:
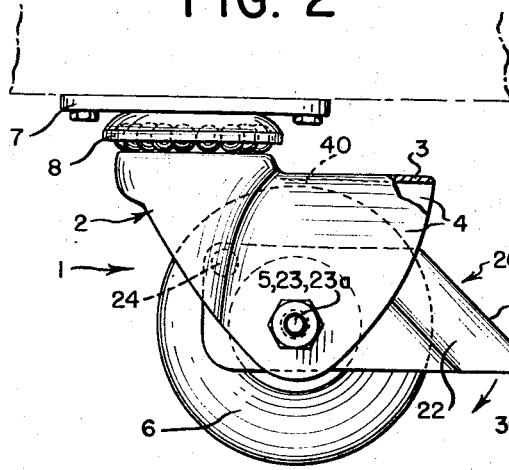
FIG. 2 is a similar view with the brake in actuated position.
Figure 3:
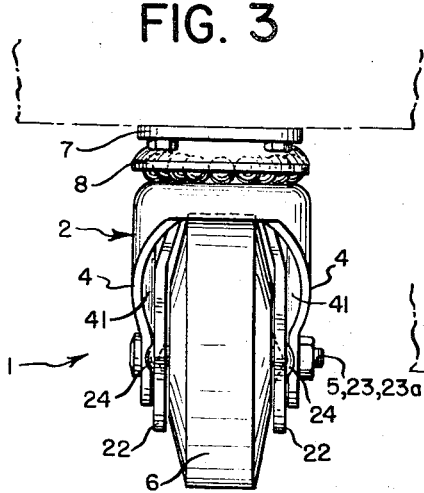
FIG. 3 is a front elevation thereof with the brake in neutral position.
Figure 4:
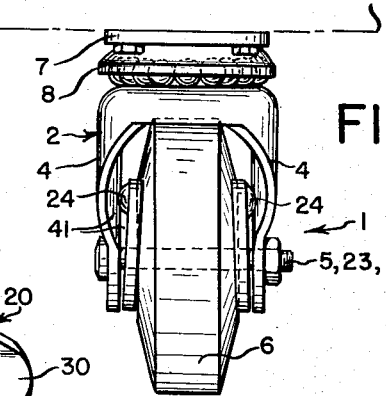
FIG. 4 is a similar view with the brake in actuated position.
Figure 5:
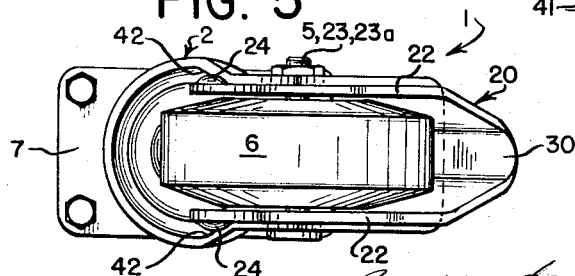
FIG. 5 is a bottom plan view thereof with the brake in neutral position.

A downward force applied to this lever 30 when the brake member is in the position shown in FIG. 1 induces a pivoting movement of the brake member about the axle 5 into the position shown in FIG. 2. This causes the cam projection 4 to engage the skirt and to apply braking force to the wheel. The brake is released by applying an upward force to lever 30 causing the brake members to pivot and cam projection 24 to become disengaged from coacting horn skirt 4. The inherent elasticity of the material will then spring the brake member away from the wheel by an amount sufficient to release the wheel.

The mounting bracket 7 comprises a flat plate with holes therethrough for attachment to equipment. Obviously the bracket may be oriented vertically, horizontally or otherwise and have a variety of shapes to cooperate with the equipment to which it is attached. Preferably the joint 8 connecting the bracket to the horn is a ball-bearing type to insure minimum friction and long wear. The axis of the bearing is generally vertical and is laterally spaced from the wheel axle to promote full castering.

The horn, brake, axle, and mounting components are all made of a strong rigid material such as steel and the wheel is preferably made of a hard rubber or like material.

I claim:

In a caster having an inverted U-shaped frame, two side skirts thereof forming the legs of the U, an axle traversing and engaging said side skirts, a wheel disposed between said skirts and mounted rotatably on said axle, and mounting means on said frame for attaching said caster to an article of equipment, the improvement in combination therewith comprising a friction-plate brake means having (a) friction plates disposed on both sides of said wheel and joined with a top part, thus forming in end-view cross-section and inverted U similar to and narrower than that of the frame, corresponding parts of said frame and plates being generally adjacent with clearance space on both sides of each plate, said plates and frame skirts having aligned holes for pivotal mounting of said plates about said axle, (b) can means which coact with each skirt and plate to cause deflection of each plate against said wheel to develop a friction force to oppose rotation of said wheel, said cam means being a rigid projection mounted on each plate and extending outwardly toward said adjacent skirt, said brake means having a lever portion which extends beyond the periphery of said wheel, said brake plates being pivotable about their axis when a force is applied to said lever portion, said pivoting engaging said cams to function, each frame skirt having an inward curving portion such that as said brake plate is pivoted said cam coacts with said curved portion urging said plate further inward developing greater force against said wheel, said brake plates springing back to normal undeflected position when the brake is released, said caster frame, plates, axle and mounting means being made of a strong, generally rigid material such as steel, and said wheel being made of rubber or the like, said axle having fixed length, its ends engaging the side skirts of said frame to maintain constant the space therebetween when the brake is actuated and said parts would tend to be forced apart, and said wheel and brake axes being coincident.

References Cited

UNITED STATES PATENTS

| 1,137,329 | 4/1915 | Johnson. | |
| 2,227,832 | 1/1941 | Herold | 188—72 |

FOREIGN PATENTS

| 298,456 | 7/1954 | Switzerland. |

MILTON BUCHLER, *Primary Examiner.*

B. S. MOWRY, T. W. BUCKMAN, *Examiners.*